US012370984B2

(12) United States Patent
Bidmead et al.

(10) Patent No.: US 12,370,984 B2
(45) Date of Patent: Jul. 29, 2025

(54) CONTROL DEVICE AND METHOD FOR AN AIRCRAFT (71) Applicant: AIRBUS OPERATIONS LIMITED, Bristol (GB)

(72) Inventors: Ashley Bidmead, Bristol (GB); Mark Johnson, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 41 days.

(21) Appl. No.: 18/397,913

(22) Filed: Dec. 27, 2023

(65) Prior Publication Data

US 2024/0227751 A1  Jul. 11, 2024

(30) Foreign Application Priority Data

Jan. 5, 2023 (GB) .................. 2300178.7

(51) Int. Cl.
*B64D 45/00* (2006.01)
*B60T 7/14* (2006.01)
*B60T 8/17* (2006.01)
*B64C 25/42* (2006.01)
*G05G 1/02* (2006.01)
(Continued)

(52) U.S. Cl.
CPC .............. *B60T 7/14* (2013.01); *B64D 45/00* (2013.01); *G05G 1/02* (2013.01); *G05G 5/05* (2013.01); *G05G 9/00* (2013.01); *B64D 2205/00* (2013.01); *G05G 2505/00* (2013.01)

(58) Field of Classification Search
CPC ...... G05D 1/1064; B64C 19/00; B60T 8/1703; B60T 8/325; B64D 2205/00; B64D 45/00
See application file for complete search history.

(56) References Cited

U.S. PATENT DOCUMENTS 8,761,965 B2   6/2014  Righi et al.
10,426,393 B2  10/2019 Bosworth et al.
10,766,605 B2   9/2020 Offredi et al.
(Continued)

FOREIGN PATENT DOCUMENTS

FR    3149298 A1 * 12/2024 ............ B60T 8/1703
GB   2 450 796 A     1/2009
(Continued)

OTHER PUBLICATIONS

Combined Search and Examination Report for GB2300178.7, dated Jul. 13, 2023, 5 pages.
(Continued)

*Primary Examiner* — Brian M O'Hara
(74) *Attorney, Agent, or Firm* — Nixon & Vanderhye P.C.

(57) ABSTRACT

A control device for an aircraft is disclosed including a push-button switch that is configured to be held in a depressed position by a pilot during taxiing of the aircraft. The push-button switch is configured to return automatically to a released position if it is not held in the depressed position by the pilot. The control device is configured to output a command for braking to a braking system of the aircraft, if the push-button switch moves to the released position during taxiing of the aircraft and does not return to the depressed position within a set time. The button may be provided on a tiller. A method of detecting on-board pilot incapacitation during an aircraft taxi phase is also disclosed.

17 Claims, 9 Drawing Sheets

(51) Int. Cl.
  *G05G 5/05*   (2006.01)
  *G05G 9/00*   (2006.01)

(56) References Cited

U.S. PATENT DOCUMENTS

| | | | |
|---|---|---|---|
| 11,230,366 B2 | 1/2022 | Shavit | |
| 11,263,912 B2* | 3/2022 | Davis | B64D 43/02 |
| 11,592,839 B2* | 2/2023 | Prosser | G08G 5/723 |
| 11,834,151 B2* | 12/2023 | Walter | B64C 13/12 |
| 11,945,571 B2* | 4/2024 | Guyamier | B64D 45/00 |
| 12,145,720 B2* | 11/2024 | Cuesta Castro | B60T 13/662 |
| 12,214,867 B2* | 2/2025 | Hayes | B60T 8/325 |
| 2007/0132311 A1* | 6/2007 | Giazotto | B60T 8/1703 |
| | | | 303/126 |
| 2007/0221782 A1 | 9/2007 | Cerchie et al. | |
| 2009/0105891 A1 | 4/2009 | Jones et al. | |
| 2019/0129448 A1 | 5/2019 | Haskins et al. | |
| 2020/0290740 A1 | 9/2020 | Rangan | |
| 2021/0049919 A1 | 2/2021 | Davis et al. | |
| 2021/0331786 A1 | 10/2021 | Georgin | |
| 2022/0340109 A1* | 10/2022 | Bidmead | B60T 8/1703 |
| 2024/0227751 A1* | 7/2024 | Bidmead | G05G 1/02 |

FOREIGN PATENT DOCUMENTS

| | | |
|---|---|---|
| JP | 2021-024560 A | 2/2021 |
| WO | 2020127703 A1 | 6/2020 |

OTHER PUBLICATIONS

"Until when will the tiller be used?", <https://www.airliners.net/forum/viewtopic.php?t=1452207>, retrieved on Dec. 11, 2023, 16 pages.

"Pedal Disconnect Button", The use of a push button switch on the steering tiller for disconnecting the rudder pedals from steering the NLG is a feature of certain Airbus aircraft as documented on the web at <https://www.airliners.net/forum/viewtopic.php?t=1452207>, 1 page, Dec. 3, 2023.

Extended European Search Report for Application No. 23218869.8, five pages, dated Jun. 3, 2024.

\* cited by examiner

CONTROL DEVICE AND METHOD FOR AN AIRCRAFT

CROSS RELATED APPLICATION

This application claims priority to United Kingdom Patent Application GB 2300178.7, filed Jan. 5, 2023, the entire contents of which is hereby incorporated by reference.

BACKGROUND OF THE INVENTION

The present disclosure relates to a control device for an aircraft and a related method. In particular, but not exclusively, the disclosure relates to detecting on-board pilot incapacitation. The disclosure also concerns an aircraft comprising such a control device.

The present disclosure has particular application to commercial passenger aircraft, but may have application in relation to other types of aircraft such as cargo aircraft.

There is a desire to reduce the number of pilots needed to safely fly an aircraft or alternatively to improve aircraft safety. Having only a single pilot in the cockpit of an aircraft, brings with it the issue of pilot incapacitation. In order to improve safety in connection with single pilot aircraft operation, it is desirable to provide systems that can cope with various scenarios in the event of pilot incapacitation.

During single pilot operation of an aircraft, it may therefore be desirable to determine whether the pilot has been incapacitated.

It is known in the prior art to use a pilot monitoring device to determine whether the pilot has become incapacitated (for example as disclosed in WO2020127703). Pilot monitoring devices that are known in the prior art include the use of a camera for acquiring images of the pilots eyes and biometric sensors. Many of the known systems for detecting pilot incapacitation require additional apparatus to be retrofitted to the aircraft and/or require sophisticated or complicated systems to be utilised, adding costs to manufacturing and maintenance of the aircraft.

Detection of pilot incapacitation is most important during single pilot operation of an aircraft. It is desirable that an aircraft be configured for both single pilot flight and multiple pilot flight.

The present invention seeks to mitigate one or more of the above-mentioned problems. Alternatively or additionally, the present invention seeks to provide an improved control device and method for detection of on-board pilot incapacitation.

SUMMARY OF THE INVENTION

The present invention provides, according to a first aspect, a control device for an aircraft. The aircraft includes a braking system. The control device preferably comprises a manually operable push-button switch movable from a released position to a depressed position. The push-button switch is configured to return to the released position if it is not manually held in the depressed position. The push-button switch is configured to be held by a pilot in the depressed position during a taxi phase of the aircraft. The control device is arranged, in response to the push-button switch moving to the released position during the taxi phase, to output a signal which causes a braking command to be issued, after a set time has passed without the push-button switch being returned to the depressed position.

Embodiments of the present invention thus address the issue of pilot incapacitation during taxiing of the aircraft, by causing braking of the aircraft in the event that the push-button switch is released (thus possibly indicating pilot incapacitation). Premature braking of the aircraft may be avoided by the issuing of a braking command only after the set time has passed, thus catering for scenarios where the pilot is not incapacitated, but accidentally and temporarily lets go of the button. A taxi phase of the aircraft may be defined as any ground maneuvering in which the aircraft is taxiing but is not in the process of taking-off. Taxiing of the aircraft includes movement of the aircraft from a departure gate to the runway for example.

The term "switch" may refer to a "push-button switch" or any other kind of switch. The term "sensor" may refer to a push-button switch or any other kind of sensor.

The push-button switch may be located on a steering tiller of the aircraft. The push-button switch may be located near a steering tiller of the aircraft. The push-button switch may be located centrally on a base of a steering tiller of the aircraft. The push-button switch may be located on a handle of a steering tiller of the aircraft. The push-button switch may be a pre-existing component of an existing aircraft. The push-button switch may be a pre-existing switch on the steering tiller. Advantageously, the control device of the present invention may not require fitting of additional apparatus in the aircraft cockpit, as a pre-existing push-button switch on the steering tiller can be reconfigured to have a secondary function.

The control device may be configured for use during single pilot operations. The control device may be configured to have a first function and a second, different function. The second different function may be for use during single pilot operation of the aircraft. The second function may be to cause a braking command to be issued in response to the push-button switch being released during the taxi phase, i.e. in accordance with any aspect of the present invention as described or claimed herein. The first function may be a primary function of the control device, for example not necessarily being limited to single pilot operation. The second function may thus be a secondary function of the control device. The push-button switch may be configured to have other functions when the aircraft is not in taxi phase. The push-button switch may be configured to have a primary function and a secondary function during single pilot operations. The control device may be configured to have a primary function and a secondary function during single pilot operations. For example, in certain aircraft it may be the case that rudder pedals can have limited authority over nose wheel steering (for example at low taxiing speeds) and the push button switch may have the function of a pedal disconnect button. Thus, for example, as part of the primary function, when the push-button switch is depressed, the control device may be configured to disconnect the control that the rudder pedals would otherwise have over nose-wheel steering, so that a rudder check can be performed with the pedals without causing the nose-wheel to be turned by the pedals. During single pilot operations, the rudder check must be carried out prior to taxiing, therefore there is no requirement for the rudder pedals to be disconnected from nose-wheel steering during taxiing. This means that the control device may be utilised during taxiing in single pilot operation to provide a secondary function.

The control device may be configured to switch from having a primary function to a secondary function when a pilot indicates to an aircraft control system that the aircraft is entering a taxi phase. The control device may be configured to switch from having a primary function to a secondary function when taxi phase is initiated during single pilot operation of the aircraft. The control device may be configured to switch from having a primary function to a secondary function once the rudder checks have been successfully completed. A taxi phase may be initiated when the aircraft leaves the boarding gate. A taxi phase may be initiated after landing of the aircraft is complete. A taxi phase may be initiated when the pilot indicates to an aircraft control system that the taxi phase has begun.

The control device may be configured to receive a plurality of signals from the push-button switch. The response of the control device to those signals may vary based on whether the control device is performing the primary function or the secondary function.

The set time may be more than 1 second, and may be less than 10 seconds, optionally 5 seconds or fewer. The set time may be between 2 and 4 seconds. The set time may be about 3 seconds for example. The delay between release of the push-button switch and the output of a command to the braking system may for example allow a pilot who is not incapacitated to replace their hand on the steering tiller and depress the push-button switch before a command is output to the braking system. Advantageously, this helps to avoid unnecessary braking of the aircraft when the pilot is not incapacitated, but accidentally or inadvertently lets go of the button for whatever reason. There may be certain embodiments in which the set time is less than 1 second. It is preferred that the time delay is long enough however to prevent a quick and temporary unintended/accidental release of the push-button switch by a pilot from causing premature and unnecessary braking of the aircraft.

The push-button switch may be spring loaded. Advantageously, this allows the push-button switch to return from the depressed position to the released position automatically. This means that should the pilot be incapacitated, the release of the steering tiller by the pilot's hand is all that is required to trigger a braking command. This control device increases the safety of the aircraft during taxiing and reduces the likelihood of excursion of the aircraft due to pilot incapacitation.

In embodiments, the push-button switch may be damped. The push-button switch may be damped and spring loaded, so that when a force holding it in the depressed position is removed, the switch moves back to the released position automatically over a period of time that may be between 1 and 5 seconds (and may correspond to the set time mentioned above). The control device may be configured in response to the push-button switch moving to the released position, to immediately output a braking command as a signal to the braking system. The released position may be defined as the stationary position the push-button switch returns to when no force is applied to it by the pilot. When the force holding the push-button switch in the depressed position has been removed, and the push-button switch is part-way between a fully depressed position and a released position it may be considered to be in a "depressed position". The released position may be defined as the position of maximum extension of the push-button switch.

The control device may be arranged to detect the incapacitation of an on-board pilot during taxi phase. During taxiing of an aircraft operated by a single on-board pilot, the pilot should keep a hand on the steering tiller at all times. The push-button switch may be located on the steering tiller of the aircraft so that it is held in the depressed position when a person has their hand on the steering tiller. Advantageously, pressing the push-button switch does not require additional effort for the single on-board pilot. If the push-button switch moves to the released position during taxiing of the aircraft, this indicates that the pilot is either incapacitated or is not following standard taxiing procedure. Advantageously, the control device can detect that the push-button switch has moved to the released position and output a command to bring the aircraft safely to a halt. In the event that the pilot removed their hand from the steering tiller on purpose and did not return their hand to the push-button switch in time to prevent the control device outputting a command for braking, the aircraft will be brought safely to a halt and the pilot can then continue to taxi the aircraft.

The control device may include a control module. The control module may be arranged to detect when the push-button switch has moved from the depressed position to the released position during taxiing and to output a signal to the braking system in response to that. The control module may be a pre-existing control module on the aircraft. The control module may be a part of a pre-existing control module on the aircraft. A pre-existing control module may be re-programmed to be configured to detect when the push-button switch has moved from the depressed position to the released position during taxiing and to output a signal to the braking system in response. The control module may be configured to receive a signal from the push-button switch when the push-button switch moves to the released position. The control module may be configured to receive a signal from the push-button switch when the push-button switch moves to the depressed position. The control module may be configured to wait a set time between receiving a signal that indicates that the push-button switch has moved from the depressed position to the released position during taxiing and outputting a command to the braking system (e.g. such that the control module issues the output command to the braking system in response to the push-button switch moving to the released position only after the set time has passed). The control module may be configured to output commands directly to the braking system. The control module may be configured to output commands directly to the hydraulic braking system. The control module may be configured to output commands directly to the electronic braking system. The control module may be configured to have a primary function and a secondary function during single pilot operation of the aircraft. Advantageously, a pre-existing control module may be re-programmed to provide the functionality of the present invention during single pilot operation of the aircraft, reducing the amount of additional apparatus that must be retrofit onto existing aircraft.

The present invention also provides an aircraft including a control device according to the first aspect installed on the aircraft.

The present invention provides, according to a second aspect, an aircraft including a control system, a braking system, a steering tiller and a sensor located on the steering tiller. The sensor is arranged to detect whether or not the steering tiller is being gripped. The control system is arranged to receive a signal from the sensor indicating whether the steering tiller is being gripped during an aircraft taxi phase. The control system is arranged to output a command for braking to the braking system in response to the signal(s) received from the sensor (including for example an absence of a signal), in the event that the steering tiller is not being gripped for a set time period. For example, it may be that the control system is arranged to output a command for braking to the braking system in response to a first signal from the sensor indicating that the sensor is not being gripped, if the control system does not receive a second signal from the sensor within a set time period indicating that the steering tiller is being gripped. The sensor may be a push-button switch as described above. For example, the sensor may be in the form of a button which is configured additionally to perform the function of a rudder pedal disconnect button (e.g. one which is provided to allow for checking of rudder control independently of nose wheel steering).

The aircraft may be a passenger aircraft. The passenger aircraft preferably comprises a passenger cabin comprising a plurality of rows and columns of seat units for accommodating a multiplicity of passengers. The aircraft may have a capacity of at least 20, more preferably at least 50 passengers, and more preferably more than 50 passengers (e.g. a hundred or more). The aircraft may be a commercial aircraft, for example a commercial passenger aircraft, for example a single aisle or twin aisle aircraft. The aircraft need not be configured for carrying passengers, but could for example be an aircraft of an equivalent size configured for cargo and/or used on a non-commercial basis. The aircraft may have a maximum take-off weight (MTOW) of at least 20 tonnes, optionally at least 40 tonnes, and possibly 50 tonnes or more. The aircraft may have an operating empty weight of at least 20 tonnes, optionally at least 30 tonnes, and possibly about 40 tonnes or more.

Such an aircraft will typically include one or more landing gear assemblies including wheel brakes. The wheel brakes may be hydraulic. The wheel brakes may be electronic. The wheel brakes may be part of the braking system. The wheel brakes may be controlled by the control system.

The control system may be configured to receive a signal from the sensor when the steering tiller is not being gripped. The control system may be configured to receive a signal from the sensor when the steering tiller is being gripped. The control system may be configured to start a timer for the set time period when it receives a signal that indicates that the steering tiller is not being gripped. The control system may be configured to output a signal to the braking system to apply braking force through the wheel brakes, if the control system receives a signal that indicates that the steering tiller is not being gripped. The sensor may send a signal to the control system to indicate that the tiller is not being gripped, and possibly only after the set time period has expired. It may be that the sensor sends a signal to the control system to indicate that the tiller is being gripped, and an absence of such a signal for the set time period causes the control system to output the command for braking to the braking system. Thus it may be that in certain embodiments the set time period is a feature of the control system and in certain other embodiments the set time period may be a feature of the sensor. The control system may be configured to only output a signal to the braking system for braking if the sensor is not gripped again within the set time period. The set time period may be between 0 and 5 seconds. The set time period may be 3 seconds. The set time period may be less than 1 second.

The control system and the sensor may be pre-existing components of the aircraft. In alternative embodiments, the control system and the sensor may be retrofitted onto the aircraft in order to adapt the aircraft for single pilot operation. The sensor may be located on the steering tiller such that when the steering tiller is gripped by the pilot during taxiing, the sensor detects that the steering tiller is being gripped The present invention provides according to a third aspect, a method of modifying an existing aircraft to make it more suited to single-pilot operations. The existing aircraft will typically have a sensor on a steering tiller with a primary function, for example to perform a rudder check. The method may comprise adapting the sensor to have a secondary function specific to single pilot operations. The sensor may be a push-button configured to move between a depressed (operating) position and a released (non-operating position). There may also be a step of adding a secondary indicator to the sensor, for example to the push-button switch, to indicate the functionality of the sensor to flight crew (e.g. to the pilot), so that its function at any given time can clearly be determined. The method also includes installing software on a system of the aircraft such that when installed the system of the aircraft detects the state of the sensor, allowing the sensor to perform the secondary function during taxiing and single pilot operations.

The method of the third aspect of the invention may be considered as a way of retrofitting a system to an existing aircraft to assist with single pilot taxiing. The method may comprise a step of adapting an existing control system of the aircraft by programing it to detect when the sensor indicates pilot incapacitation (which may be when a switch is released, moves from the depressed position and/or returns to the released position) during taxiing, for example during single pilot operation of the aircraft. The method may comprise a step of programing a control system to output a command for braking to a braking system of the aircraft in response to detecting pilot incapacitation during taxiing, for example if the push-button switch is not returned to the depressed position within a set time period.

It will be understood that in certain embodiments of the invention, the push button switch described in relation to the first aspect may be replaced with a sensor that detects physical contact with the pilot in a different manner. Also, the location of the push button, sensor or the like need not necessarily be on the steering tiller as required by various embodiments of the second aspect of the present invention.

The present invention provides, according to a fourth aspect, a method of detecting on-board pilot incapacitation during an aircraft taxi phase. The method may be performed on an aircraft described or claimed herein. The method comprises a first step of a switch (e.g. a push-button switch or other sensor that switches or moves according to whether or not there is physical contact with it or the like) automatically moving to a released position if it is not held in position (e.g. a depressed position) by the on-board pilot. The switch may be spring loaded in order to allow it to automatically move to the released position when not under pressure from the pilot. The method comprises a step of detecting that the switch has moved from the held/depressed position, for example detecting that the switch has moved to the released position. The switch may be configured to output a signal to a control module when it moves from the held/depressed position. The switch may be configured to output a signal to a control module when it moves to the released position. The signal could simply be a binary signal with "1" representing a first state (e.g. button held by pilot) and with "0" representing a second state (e.g. switch not held by pilot). The method may comprise a further step of waiting for a specified time period, before one of the following occurs: either (a) the switch returns to the depressed position before the end of the time period, or (b) as a consequence of the switch not being in the depressed position throughout the time period (e.g. remaining in the released position throughout the time period), outputting a command to a braking system of the aircraft for braking.

The specified time period may be between 1 and 5 seconds. The method may comprise outputting a command to the braking system of the aircraft for braking immediately after the switch moves to the released position, which may be a short time delay after the switch is released.

The method may comprise the step of the aircraft entering a taxi phase. The method may comprise the step of the on-board pilot moving the switch to the depressed position. The method may comprise the step of the on-board pilot holding the switch in the depressed position as they taxi the aircraft. The method may include a step of the aircraft completing a taxi phase, at which time the pilot is no longer required to depress the switch in order for braking not to be applied. The function of the switch to indicate pilot incapacitation in order for braking to be applied may be disabled, or otherwise not functional, when the aircraft is not in the taxi phase. The end of the taxi phase may be detected or confirmed by the method. For example, there may be a step of detecting the operation of a device in the cockpit used in relation to take-off, for example the moving of an engine thrust lever or the like. As such a lever can only be operated by a human, it can be assumed that the flight crew is not incapacitated and also that the taxi phase is over. Alternatively, the flight crew could have a button to select in the cockpit that will enable them to confirm that they are entering the take-off phase and disable the function of the switch to indicate pilot incapacitation The method may be performed on an aircraft according to any aspect of the present invention as claimed or described herein.

It will of course be appreciated that features described in relation to one aspect of the present invention may be incorporated into other aspects of the present invention. For example, the method of the invention may incorporate any of the features described with reference to the apparatus of the invention and vice versa. The control system of the second aspect may have features of the control device of the first aspect of the invention and vice versa for example.

DESCRIPTION OF THE DRAWINGS

Embodiments of the present invention will now be described by way of example only with reference to the accompanying schematic drawings of which.

DETAILED DESCRIPTION

Figure 1:
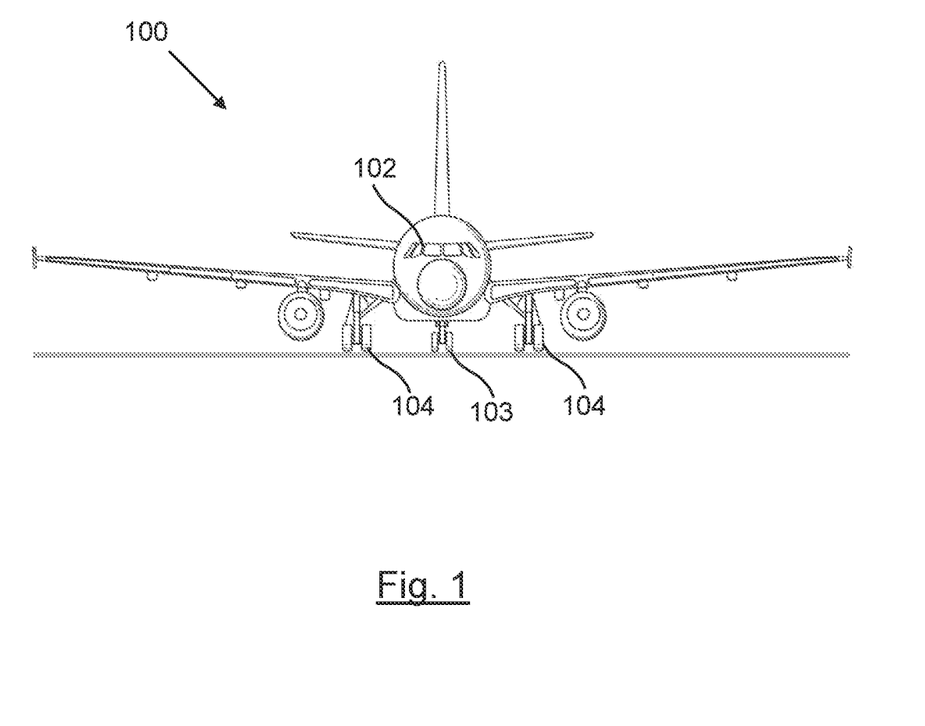
FIG. 1 shows a front view of an aircraft according to an embodiment of the invention.

Embodiments of the present invention relate to detection of on-board pilot incapacitation during single pilot operation of an aircraft when taxiing. Such an aircraft is shown in FIG. 1. FIG. 1 shows the aircraft 100 with its landing gear (103 and 104) extended during taxi phase.

A steering tiller is commonly located in the cockpit 102 of the aircraft 100 and is used to steer the nose-wheel landing gear 103 during taxiing. The aircraft has a rudder and associated rudder pedals (not shown). Operation of the rudder pedals at low taxiing speeds controls not only the rudders but also has limited authority over steering of the nose-wheel landing gear. The main landing gear 104 typically includes hydraulic brakes that can respond to commands issued by an aircraft braking system.

Figure 2:
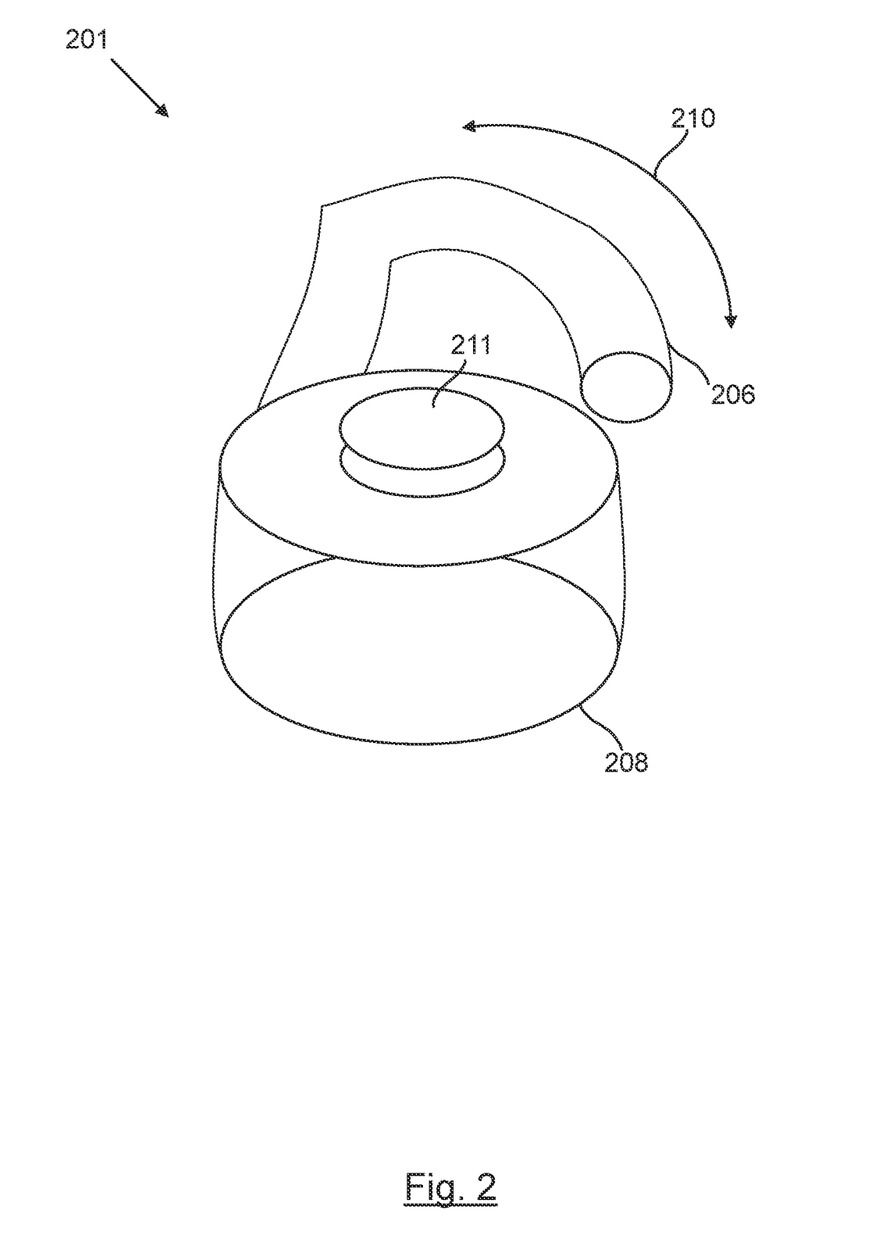
FIG. 2 shows a perspective view of a steering tiller of the prior art.

FIG. 2 shows a steering tiller 201 according to the prior art. The steering tiller 201 comprises a handle 206 which is configured to be manually rotated (as shown by arrow 210) by a pilot during taxiing. The handle 206 extends from the base 208 of the steering tiller 201. The base 208 and the handle 206 of the steering tiller 201 are configured to be gripped by a pilot during taxiing. The steering tiller 201 has a push button 211 located on or near the centre of the base 208. The push button 211 when pressed has the function of disconnecting the rudder pedals from having any authority over the steering of the nose-wheel landing gear 103, so that a rudder check can be carried out by a member of the flight crew. The button 211 is typically referred to as the pedal disconnect button.

Figure 3A:
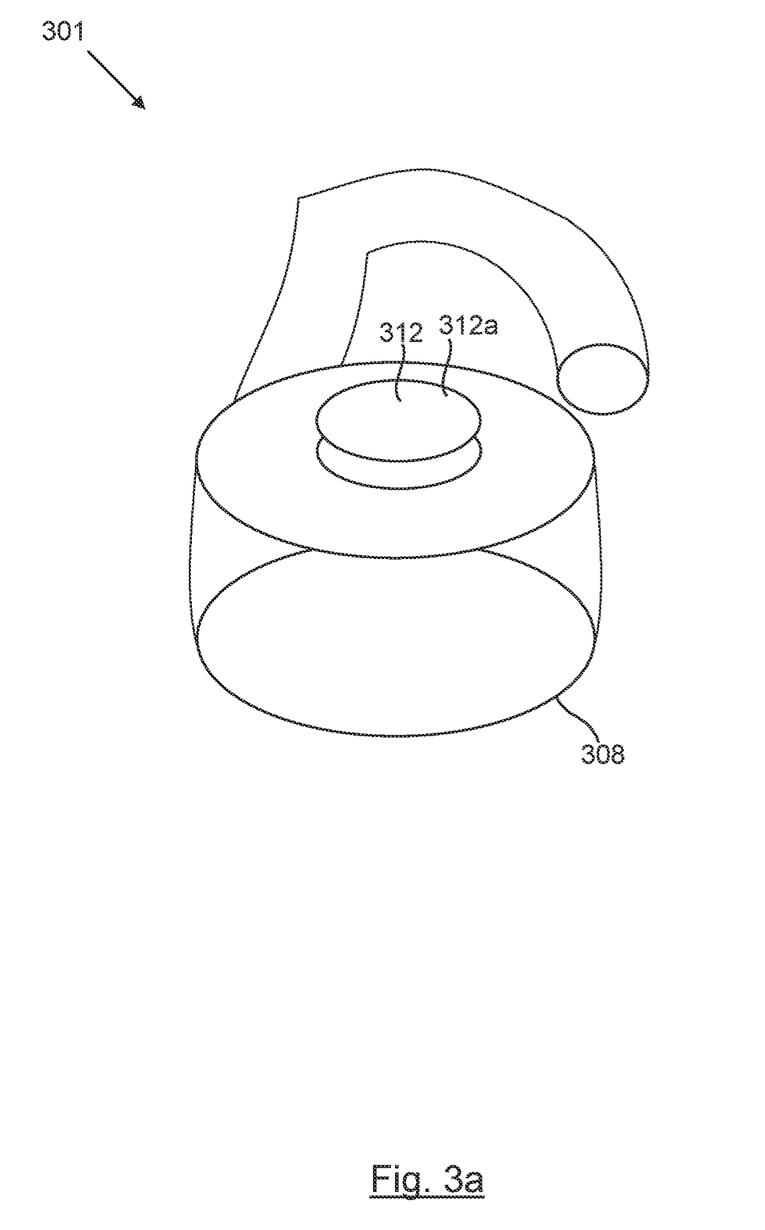
FIG. 3a shows a perspective view of a steering tiller according to an embodiment of the invention, with a stop switch in a released position.
Figure 3B:
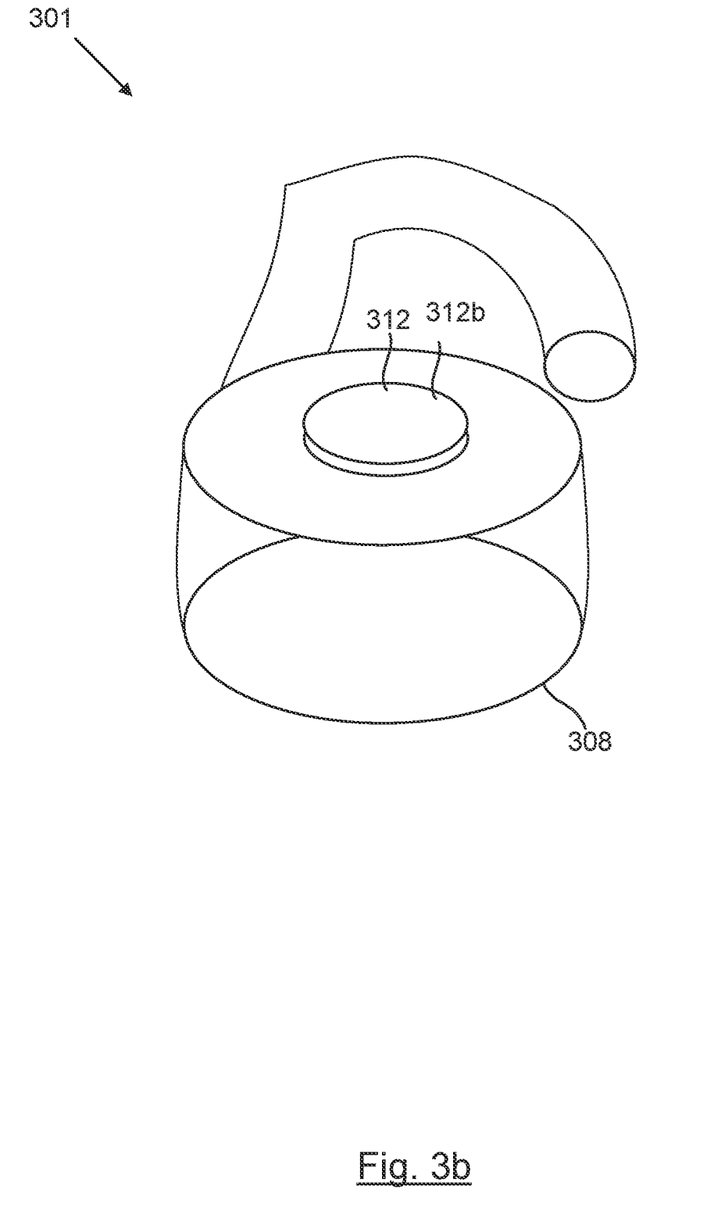
FIG. 3b shows a perspective view of a steering tiller according the embodiment of FIG. 3a, with the stop switch in a depressed position.

FIGS. 3a and 3b show a steering tiller 301 in accordance with an embodiment of the present invention. The steering tiller 301 has a push-button switch 312 located on the base 308 of the steering tiller 301. FIG. 3a shows the push-button switch 312 in a released position 312a, whereas FIG. 3b shows the push-button switch 312 in a depressed position 312b. The push-button switch 312 is located on the base 308 of the steering tiller 301 such that when the steering tiller 301 is gripped by a pilot, the push-button switch 312 is held in the depressed position 312b as shown in FIG. 3b. The push-button switch 312 has a primary function on the aircraft of a rudder pedal disconnect button as described above, so that a rudder check can be performed during or before taxiing. The push-button switch 312 also has a secondary function on the aircraft for use during taxiing of the aircraft when in single pilot operation mode, when the button is used in combination with a control system or other device on the aircraft to cope with a scenario of single pilot operation and subsequent pilot incapacitation. In summary, when carrying out the secondary function, the pilot presses the push-button switch during taxiing when commanding steering and if the button is released, the aircraft system(s) apply full pedal braking to stop the aircraft, in case the pilot has become incapacitated. Full braking is automatically applied in such a scenario, but only after a confirmation time (e.g. time delay) to avoid erroneous activation. The naming of the push-button switch 312 (and associated labelling, or other indicia) includes appropriate indications to inform the flight-crew/pilot the function(s) of the push-button switch, for example its function at a given time/phase of operation.

Figure 4A:
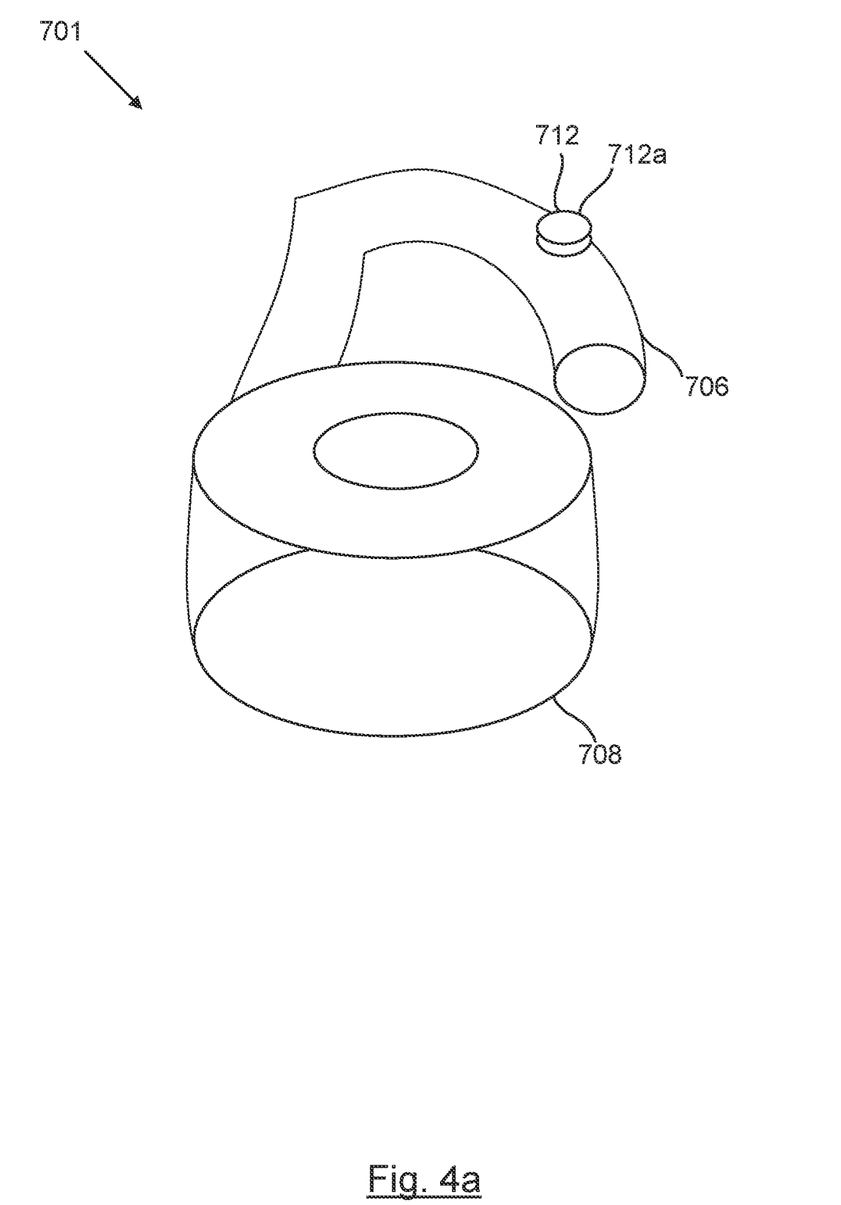
FIG. 4a shows a perspective view of a steering tiller according to an alternative embodiment of the invention, with a stop switch in a released position.
Figure 4B:
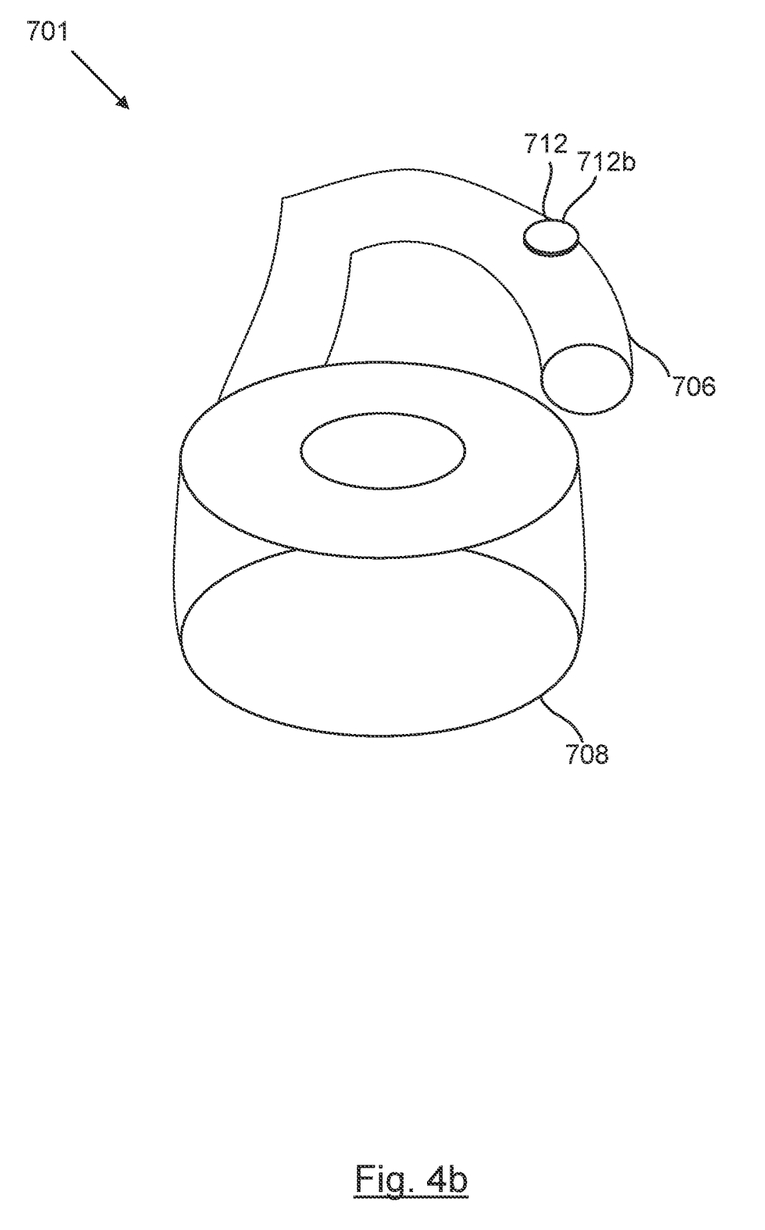
FIG. 4b shows a perspective view of a steering tiller according to the embodiment of FIG. 4a, with the stop switch in a depressed position.

FIGS. 4a and 4b show an alternative embodiment of a steering tiller 701. The steering tiller 701 has a push-button switch 712 located on the handle 706 rather than on the base 708. FIG. 4a shows the push-button switch 712 in a released position 712a. FIG. 4b shows the push-button switch 712 in a depressed position 712b. The push-button switch 712 is located on the steering tiller 712 such that when the steering tiller 701 is gripped by a user the push-button switch 712 moves to the depressed position 712b. This button 712 may also perform the function of a pedal release button. Alternatively, a separate pedal release button could be provided in the base of the tiller in the position as shown in FIG. 2.

Figure 5:
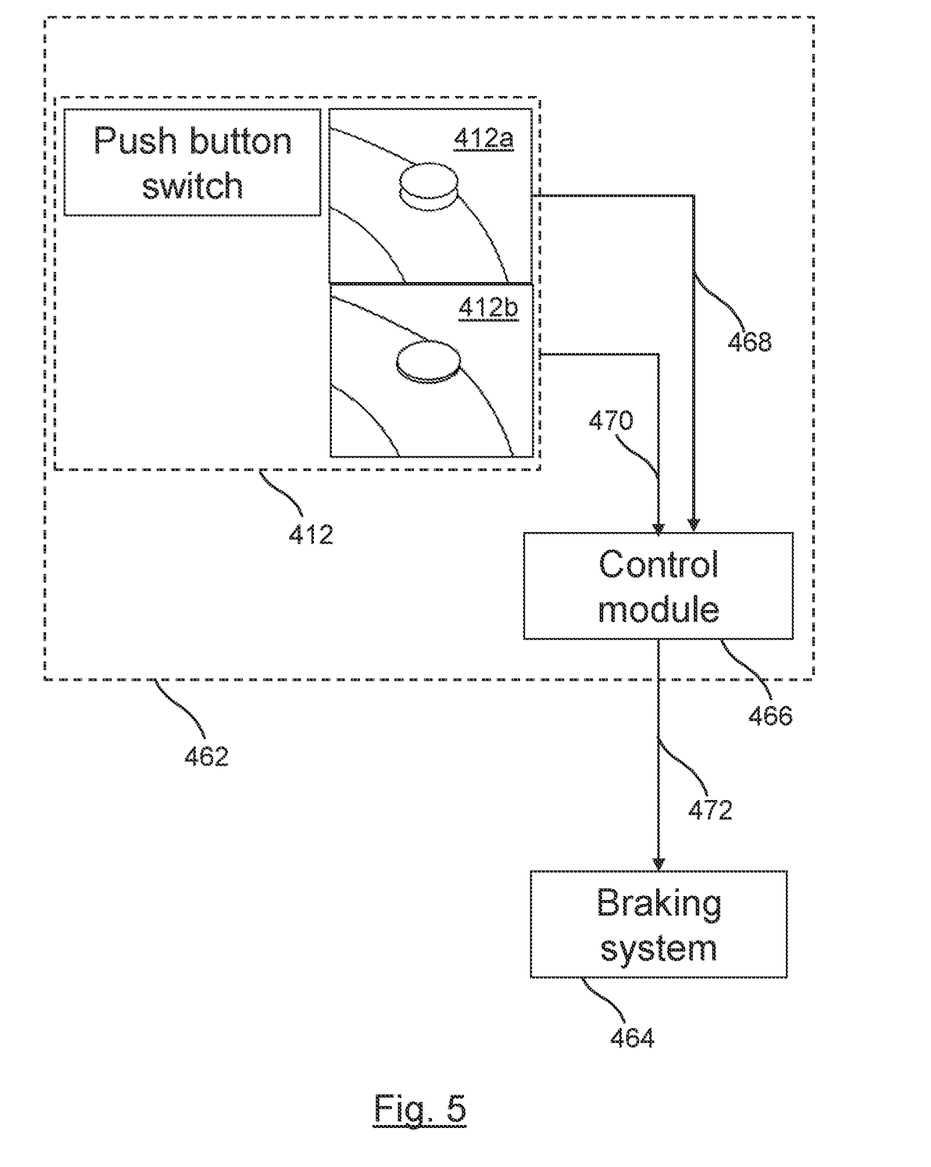
FIG. 5 shows a schematic of a control device according to an embodiment of the invention.

FIG. 5 shows a control device 462 for detecting pilot incapacitation during an aircraft taxi phase according to an embodiment of the invention. The control device comprises a push-button switch 412 that is located on the steering tiller (not shown) in the cockpit and a control module 466. The push-button switch has two states: a released position 412a and a depressed position 412b. The control module 466 is arranged to receive a released signal 468 when the push-button switch 412 moves to the released position 412a and a depressed signal 470 when the push-button switch 412 moves to the depressed position 412b. During a taxi phase of the aircraft under single pilot operation of the aircraft, the control module 466 is configured to detect the released signal 468 that indicates that the push-button switch 412 has moved to the released position 412a. The control module 466 is configured to output a command for braking 472 to the braking system 464 of the aircraft, if the depressed signal 470 is not received within a set time period after the released signal 468 (in this case being 3 seconds), which is judged long enough to allow a pilot who accidentally releases the button to regain control and re-press the button, but short enough to apply the brakes quickly in the event of pilot incapacitation.

Release of the push-button switch 412 during taxiing indicates that the pilot or a member of the flight crew has taken their hand off the steering tiller. After the set time period has passed, it is assumed that the detected and sustained release of the push-button switch 412 indicates pilot incapacitation. If the button is pressed shortly after being released it may be assumed that the removal of the hand from the switch 412 was on purpose and that the pilot has temporarily moved their hand in order to operate another cockpit switch, or that the pilot accidentally let go of the switch temporarily. In the case where the removal of their hand was on purpose or accidental, and the pilot remains in control of the aircraft, the pilot must bring their hand back onto the steering tiller (and therefore move the push-button switch 412 to the depressed position 412b) before the end of the set time period in order to stop the control module 466 outputting a command for braking 472 to the braking system 464 of the aircraft. If the pilot has become incapacitated, the push-button switch 412 will remain in the released position 412a for the remainder of the set time period and the control module 466 will output a command for full braking 472 to the braking system 464 to bring the aircraft safely to a halt. With such a simple system in place it is important not to apply the brakes instantly in the event that the button is released, as that would potentially cause many inconvenient false alerts. The embodiment has the advantage of allowing an existing aircraft to be retrofitted with the system, in a simple and relatively low-cost manner—whilst not being so simple and cumbersome as resulting in a system which immediately applies the brakes in the event of the pilot letting go of the button for only a fraction of a second.

Figure 6:
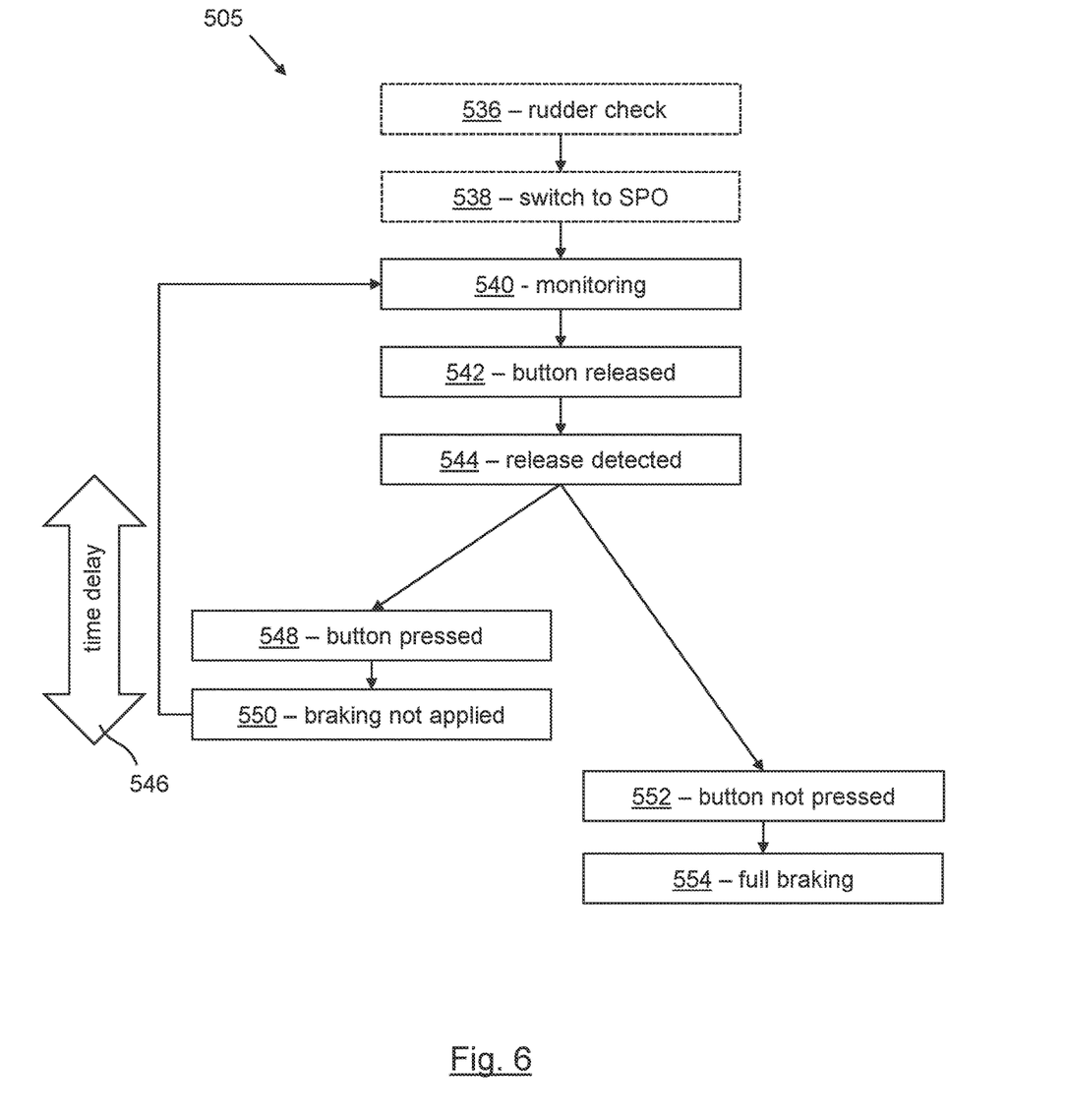
FIG. 6 shows a flow diagram of a method of detecting on-board pilot incapacitation during an aircraft taxi phase according to an embodiment of the invention.

FIG. 6 shoes a sequence of method steps 505 that are performed during a method of detecting on-board pilot incapacitation during an aircraft taxi phase according to an embodiment of the invention. In a first step, 540 a control module monitors for whether a push-button switch is being held in a depressed position by the on-board pilot or in a released position. Next, as step 542, the push-button switch automatically moves to a released position because it is not being held in a depressed position by the on-board pilot. In the next step, 544, the control module detects that the push-button switch has moved from the depressed position to the released position. The control module waits for a specified time period (indicated by arrow 546). Then depending on whether the control module receives a further signal from the push-button switch during the time period, the method follows one of two paths which will now be described. Either, the push-button switch returns to the depressed position before the end of the time period, step 548, braking is not automatically applied (indicated by box 550), and the control module then returns to monitoring for further signals from the push-button switch. Or, the push-button switch is not pressed by the pilot and instead remains in the released position throughout the time period, (indicated by box 552), and the control module outputs a command to a braking system of the aircraft for braking, step 554. FIG. 6 shows two other steps that may be performed, before the control module starts monitoring for pilot incapacitation. There may be a step 536 of performing a rudder check when the aircraft is stationary, which may utilise the same push-button switch as used in the subsequent steps. There may be a step 538 of switching to a single pilot operation ("SPO") mode, or otherwise switching the function of the push-button switch to SPO mode, before taxiing is commenced.

Figure 7:
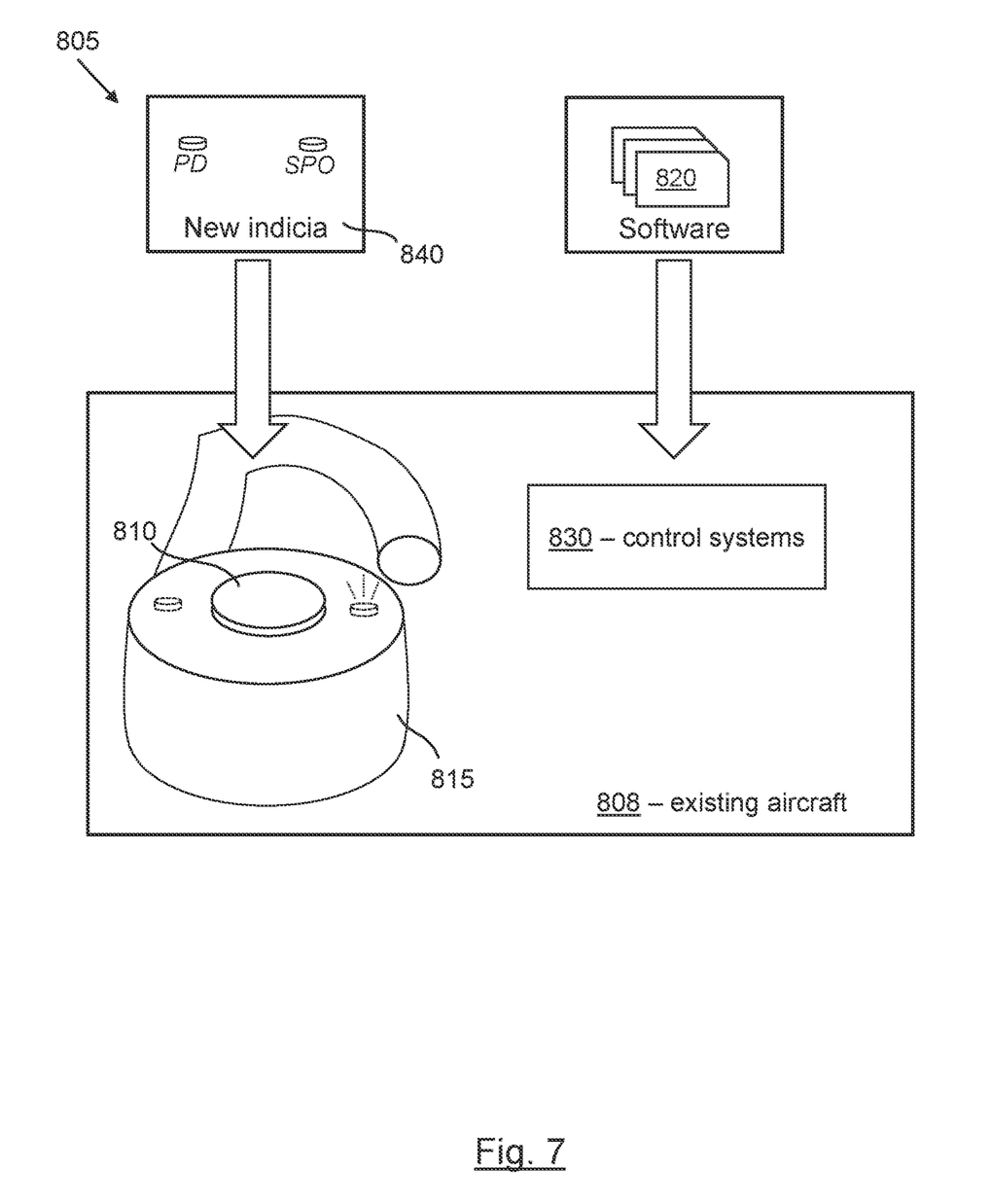
FIG. 7 shows a diagram of a method of retrofitting a single pilot operation mode function onto an existing aircraft according to an embodiment of the invention.

FIG. 7 shows a method 805 of retrofitting a single pilot operation mode function onto an existing aircraft 808 to make it more suited to single-pilot operations. The existing aircraft 808 has a pedal disconnect button 810 on a steering tiller 815. The primary function of the button 810 is to allow the rudder pedals (not shown) of the aircraft to be disconnect from controlling nose wheel steering. The method comprises installing software 820 onto the aircraft 808 including its existing computer and control systems 830 which adapts the button 810 to have a secondary function specific to single pilot operations. The method also includes adding indicia 840 in the form of two lights to show which of the two functions the button is in, either a pedal disconnect function ("PD") mode (the primary mode) or a single pilot operation ("SPO") mode (the secondary mode). Example positions of such indicia are shown in dotted line on the existing tiller 815 in FIG. 7. The software causes the existing systems 830 on the aircraft to perform a method as shown in FIG. 6, when the aircraft is in SPO taxiing mode. Thus, when in this mode, the pilot needs to press the button 810 in order to perform taxiing manoeuvres. If the button is released, and remains released for a set time period, of say 3 seconds, then the software causes the braking system of the aircraft to be commanded to apply full braking. The retrofitting is primarily in software, requires little in the way of extra apparatus (only the addition of the new indicia 840) and therefore provides a straightforward, yet elegant way, in which to convert an existing aircraft so as to enable safe taxiing in a SPO mode.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

In embodiments, the push-button switch may be damped so that it takes a set period of time to return from a fully depressed position to the released position once a pilot ceases to apply pressure to the push-button switch. The time it takes for the push-button switch to return to the released position acts to provide a buffer of 1 to 5 seconds, in which if a pilot moves the push-button switch back to the fully depressed position, no command will be sent to the braking system. In this alternative embodiment, when the push-button switch moves to the released position, a command for braking is immediately output to the braking system of the aircraft. There is no delay period after the push-button switch has returned to the released position. In this alternative embodiment, the released position is defined as the position the push-button switch returns to when no force is applied to the switch by a pilot and when the switch is not returning from the fully depressed position. If the push-button switch is released it will continue to remain in the "depressed position" until it has fully extended to the released position.

There may be embodiments where a different type of means is provided on the tiller, or other part of the aircraft, to enable pilot incapacitation to be determined. For example, a touch-sensitive pad could be provided. Another alternative might be a sprung lever, or a sprung rocker-switch, or other physical thing that needs to be held in place to provide an indications that the pilot is not incapacitated. This could be in the form of a button, lever, sensor or signal etc. The function of the embodiments could be provided by using a different discrete/button in the cockpit. Other equivalent means will readily be determined by the skilled person.

There may additionally be another means to detect flight crew incapacitation in the cockpit such as a button which is pressed every x minutes (say every 5 minutes). It will be appreciated however that such a system of itself would be inadequate to detect pilot incapacitation when taxiing because of the severity of maintaining taxi for a period as long as, say 5 minutes, if the pilot is incapacitated and no longer in control of the aircraft on the ground.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The term 'or' shall be interpreted as 'and/or' unless the context requires otherwise.

The invention claimed is:

1. A control device for an aircraft, the aircraft including a braking system, the control device comprising:
 a manually operable push-button switch movable from a released position to a depressed position,
 the push-button switch being configured to return to the released position if it is not manually held in the depressed position,
 the push-button switch being configured to be held by a pilot in the depressed position during a taxi phase of the aircraft,
 the control device being arranged, in response to the push-button switch moving to the released position during the taxi phase, to output a signal which causes a braking command to be issued, after a set time has passed without the push-button switch being returned to the depressed position.

2. The control device according to claim 1, wherein the push-button switch is located on a steering tiller of the aircraft.

3. The control device according to claim 1, including a control module arranged to detect when the push-button switch has moved from the depressed position to the released position during taxi phase and to output a signal to the braking system in response.

4. The control device according to claim 1, wherein the control device is configured to have a first function and to have a second function during single pilot operation of the aircraft, the second function being different from the first function.

5. The control device according to claim 4, wherein the first function is to allow a rudder check to be performed with rudder pedals without causing a nose-wheel to be turned by the pedals.

6. The control device according to claim 5, wherein the push-button switch is located on a steering tiller of the aircraft.

7. The control device according to claim 1, wherein the set time is between 1 and 5 seconds.

8. The control device according to claim 1, wherein the push button switch is spring loaded.

9. An aircraft, comprising:
 a control system,
 a braking system,
 a steering tiller, and
 a sensor located on the steering tiller for detecting whether or not the steering tiller is being gripped,
 the control system being arranged to receive a signal from the sensor indicating whether the steering tiller is being gripped during an aircraft taxi phase, and to output a command for braking to the braking system in response, in the event that the steering tiller is not being gripped for a set time period.

10. An aircraft according to claim 9, wherein the sensor located on the steering tiller is configured additionally to perform the function of a rudder pedal disconnect button which is provided to allow for checking of rudder control independently of nose wheel steering.

11. An aircraft including the control device according to claim 1.

12. A method of modifying an existing aircraft to make it more suited to single-pilot operations, the aircraft having a sensor on a steering tiller with a primary function, the method comprising:
 adapting the sensor to have a secondary function specific to single pilot operations;
 adding a secondary indicator to the sensor to indicate the functionality of the sensor to flight crew; and
 installing software on a system of the aircraft such that when installed the system of the aircraft detects the state of the sensor allowing the sensor to perform the secondary function during taxiing and single pilot operations.

13. A method of detecting on-board pilot incapacitation during an aircraft taxi phase, comprising:
 a switch automatically moving to a released position if it is not held in a depressed position by the on-board pilot;
 detecting that the switch has moved from the depressed position;
 waiting for a specified time period, before one of
 (a) the switch returning to the depressed position before the end of the time period; or
 (b) as a consequence of the switch not being in the depressed position throughout the time period, the method further comprises outputting a command to a braking system of the aircraft for braking.

14. The method according to claim 13, the method further comprising:
    the aircraft entering taxi phase;
    the on-board pilot moving the switch to the depressed position; and
    the on-board pilot holding the switch in the depressed position.

15. The method according to claim 13, wherein the specified time period is between 1 and 5 seconds.

16. The method according to claim 13, wherein the aircraft comprises a control system, a braking system, a steering tiller, and a sensor located on the steering tiller for detecting whether or not the steering tiller is being gripped, the control system being arranged to receive a signal from the sensor indicating whether the steering tiller is being gripped during an aircraft taxi phase, and to output a command for braking to the braking system in response, in the event that the steering tiller is not being gripped for a set time period.

17. An aircraft arranged to allow for performance of the method of claim 11.

\* \* \* \* \*